United States Patent Office 3,046,194
Patented July 24, 1962

3,046,194
TREATMENT OF PLANTS
Jack Ziffer, Milwaukee, Wis., assignor to Pabst Brewing Company, Chicago, Ill., a corporation of Delaware
No Drawing. Filed Mar. 14, 1960, Ser. No. 14,540
20 Claims. (Cl. 167—65)

This invention relates to the control of plant diseases by means of antibiotic fungicides, and more particularly, to control and eradication of powdery mildew by the antibiotics identified by the arbitrary names Phytoactin and Phytostreptin, now known by the non-proprietary names of "polyamidohygrostreptin" and "polyaminohygrostreptin," respectively.

An important object of the invention is to control and eradicate powdery mildew diseases of crop-bearing plants, i.e., plants which bear fruits or vegetables.

Another important object is to control and eradicate powdery mildew diseases of ornamental plants, and especially, those which bear flowers.

A further important object is to control and eradicate fungus diseases caused by certain microorganisms which produce powdery mildew on plants.

The powdery mildews comprise a large number of pathogens which affect many host plants. All species are parasitic, and, as in the rusts, the parasitism is obligate. These pathogens are all members of the Ascomycetes (ascus-bearing fungi) and belong to the family Erysiphaceae in the order Erysiphales. In almost all species, the fungi produce white to grayish growth of mycelium, conidiophores, conidia, and dark-colored cleistothecia superficially on the surface of the host. In a few species, the mycelium is found within the host. The fungus obtains its nourishment through haustoria which penetrate into the epidermal cells. The fungal hyphae are abundantly septate and are composed of uninucleate cells, although sometimes the unicellular haustoria are found to be plurinucleate. Conidia are borne in chains and are readily detached and dispersed by air currents. Many of the powdery mildew diseases are most severe under dry climatic conditions. The powdery mildews of cereals, however, are most destructive in areas where moist conditions prevail. The powdery mildew species are classified on the basis of the relationship of the mycelium to the host and the number of asci, and the following are the recognized species:

Sphaerotheca
Podosphaera
Uncinula
Microsphaera
Erysiphe
Phyllactinia

Powdery mildews attack many plants and take a great toll of plant life. The powdery mildews are especially destructive to fruit trees, vegetable and grain plants, and ornamental plants. Once infection occurs, the fungus cannot be controlled by the use of protectant-type fungicides because the haustoria, which have penetrated into the epidermal cells, are not affected. For this reason, eradicant-type fungicides are desirable for the control of these diseases, and protectant-type fungicides are rarely recommended or used for this purpose.

Sulfur acts as an eradicant fungicide against powdery mildews, but there are serious shortcomings to its use. For example, in the Far West, notably in the important warm, dry apple-growing valleys of Washington, sulfur cannot be used for the control of apple powdery mildew after the first cover spray because of the danger of injury from sulfur shock or of fruit scald. Apple powdery mildew, caused by the fungus *Podosphaera leucotricha*, is one of the most important mildew diseases, and is especially serious in the Far West. Many varieties of apples are no longer being grown in this region because of their susceptibility to this disease. Even when sulfur is applied during the early season, infections of 5–20% occur. During the summer months, when it is not safe to use sulfur, the mildew spreads, and by fall, the infection on the trees may be as high as 30–45% (USDA Yearbook of Agriculture, 1953, p. 669).

Another disadvantage of some eradicant fungicides presently available for controlling fungus diseases is that in many cases, they are specific in action and do not control all the important diseases attacking the same plant. For example, powdery mildew and apple scab, which is caused by another type of Ascomycete fungus (*Venturia inaequalis*), are the two most important diseases of apples. Karathane (dinitro (1-methylheptyl) phenyl crotonate) shows eradicant action against apple powdery mildew but very little eradicant action against apple scab. Cyprex (n-dodecylguanidine acetate), on the other hand, shows eradicant action against apple scab, with little eradicant action against apple powdery mildew.

It has been discovered in accordance with the present invention that excellent control and eradication of powdery mildews and of the causative microorganisms is achieved by the application of one of the antifungal antibiotics, polyamidohygro-streptin and polyaminohygrostreptin. It is especially important that the antifungals not only control powdery mildews, but also act as eradicants of the causative organisms. Further it has been discovered that, as in the example of apple trees, not only is apple powdery mildew controlled and eradicated by these antifungals but the very important apple scab disease is controlled and eradicated by these antifungals.

Powdery mildew plant disease is controlled in the invention by contacting the causative fungus in the vicinity of susceptible plants, with one or both of the antifungal substances, phytoactin and phytostreptin. The application of the antifungals combats powdery mildew on fruit trees, truck crops, field crops, and ornamentals.

The invention is especially directed to powdery mildew diseases of the following plants, caused by the microorganisms indicated:

Roses (*Sphaerotheca pannosa* var. *Rosae*)
Phylox (*Erysiphe cichoracearum*)
Zinnia (*Erysiphe cichoracearum*)
Apples (*Podosphaera leucotricha*)
Pears (*Podosphaera leucotricha*)
Beans (*Erysiphe polygoni*)
Cucumbers (*Erysiphe cichoracearum*)
Squash (*Erysiphe cichoracearum*)
Wheat (*Erysiphe Graminis* DC)

Powdery mildew disease is controlled by applying one of the antifungals so that it ultimately contacts the causative fungus. To this end, the antifungal may be applied to the area where the fungus either is or ultimately may be present. It is preferred to apply the antifungal on the plants under control, and it may be applied to the surrounding soil and vegetation. The antifungal may be applied to the plants by spraying or otherwise contacting with an aqueous dispersion of the antifungal, or a solid composition may be dusted on the plants. Aerial and ground spray and dust applications may be used.

An appropriate aqueous liquid, aqueous-organic liquid, or organic liquid solution or other type of dispersion, such as emulsions and wettable powder suspensions, is selected for spray applications, having regard to the nature of the plant and the effect of the diluents thereon, e.g. selecting ingredients which are not significantly phytotoxic. The antifungal is present in a fungicidal concentration which is selected so as not to be significantly toxic to the plants, in the range of about 5 to 2000 parts per million. It is generally preferred and effective to provide a concentration of about 100–200 p.p.m. and a concentration range of 50 to 400 p.p.m. is widely effective. The antifungal may be applied in an effective range of about 1 to 1000 gallons per acre, so that about 0.1 to 2000 grams of antifungal are applied per acre.

Alternatively, a solid composition may be employed. The antifungal is then preferably present in an appropriate concentration in the range of about 0.01% to 10% by weight, together with an inert substantially non-phytotoxic agricultural type diluent, e.g. bentonite, diatomaceous earth, infusorial earth, pumice, etc. Fermentation solids may be employed as the diluent. The solid composition may be dusted on the plants or surrounding areas in the usual manner. Plant stickers and/or surface active agents may be incorporated in the solid compositions to assist in the application.

It may be further preferable to include in the foregoing compositions, a small proportion of a surface active agent, as described in my copending application, Serial No. 836,889, filed August 31, 1959. The concentration of surface active agent is preferably in the range of about 0.01 to 0.35% by weight in the liquid dispersions, and the concentration may be higher in the dry solid compositions, e.g. up to 5% by weight.

A preferred class of surface active agents includes the polyoxyalkylene glycol monoether agents. It is further preferred to employ a monoether of a polyoxyalkylene glycol and a hydrophobic hydroxy compound, e.g. an alkyl phenol or a partially esterified polyhydric alcohol. Various surface active agents may be employed in the aqueous dispersions. Surface active agents which are also especially suited for producing clear oily solutions include, for example, a non-ionic, water-insoluble, oil-soluble alkyl aryl polyether alcohol (e.g. Triton X–45), a non-ionic iso-octyl phenoxy polyethoxy ethanol, such as the reaction product of octylphenol with 10 mols of ethylene oxide (e.g. Triton X–100), a non-ionic water-dispersible alkyl aryl polyether alcohol (e.g. Triton X-155), a non-ionic nonyl phenoxy polyoxyethylene ethanol (e.g. Igepal CO–430, Igepal CO–530, and Arctic Syntex 036), or a non-ionic polyoxyethylene sorbitol oleate-laurate (e.g. Atlox 1045A).

The antifungal is applied by conventional spray and dusting equipment, and at the usual times, frequencies, and durations of application for the particular plants. Thus, application of the antifungal normally commences with the first appearance of powdery mildew on the leaves of the plant. The time of year varies with the plant and with the growing season and weather conditions. Initially, a relatively high rate of application may be employed. Thereafter, periodic reapplication is made, upon reappearance of the fungus, or preferably, more frequently, and preferably until the crop has substantially matured and/or will no longer be substantially adversely affected by the disease. For example, approximately weekly or bi-weekly applications may be made, and the applications may be more frequent during rainy periods, i.e., it may be advisable to apply the antifungal after each rain. It is recommended that the treatment be discontinued about one to three months prior to harvest of crops, depending upon the plant. It is advisable to treat the ornamentals from the time of leaf appearance to the end of the growing season.

It will be understood of course that the treatment can be applied to the foliage and/or other parts of the plant as a preventative before any infection of the plant occurs. In treating fruit bearing plants, such as, for example, apple trees, the treatment of the tree including the foliage and fruit with Phytostreptin and Phytoactin during the growing season not only controls or destroys powdery mildew but also controls or destroys apple scab.

Phytostreptin is water-soluble and Phytoactin is slightly soluble in water, producing an homogeneous colloidal solution. The antifungals are preferably first provided in the form of a concentrate in a water miscible organic solvent, which may contain a surface active agent. Purified forms of the antifungals may be employed, or for economy, technical grade fermentation products or concentrates thereof may be used. Such technical products may be obtained in any stage of the recovery of the antifungal from the fermentation product. It is preferred that the product be concentrated sufficiently so that the antifungal content is in excess of about 25 milligrams per gram of solids. In the latter case, it is more preferable to include a surface active agent, as the associated fermentation by-products are more readily maintained in dispersion. Also, as described in my aforesaid copending application, Serial No. 836,889, increased activity has been noted with the combination containing a surface active agent. The purified and technical grade products likewise may be employed in the solid compositions, by intimately mixing the dry products, concentrates, or dilute dispersions thereof with diluents, and drying if necessary.

The solvent employed for producing the antifungal concentrate is preferably a lower alkanol such as methanol, ethanol, or, further preferably, isopropanol. The antifungal concentration in the concentrate is preferably in the range of 10 to 250 milligrams per milliliter of solvent, and the surface active agent is preferably present in a weight ratio to the antifungal in the range of about 5 to 125:1. When a liquid dispersion is to be employed, the concentrate either containing or preferably first mixed with the surface active agent is diluted with water or organic liquid to the use concentration. The preferred concentration of the surface active agent in the solution applied for treatment is in the range of about 100 to 3500 p.p.m., or 0.01 to 0.35 percent by weight.

When employing the pure antifungals, the alkanol concentrates may be diluted with water to the use concentrations. The technical grade antifungal preparations are preferably first diluted with several additional volumes of the solvent, prior to dilution with water, especially in the case of the less water soluble Phytoactin. Alternatively, a surface active agent may be incorporated as indicated above, without need for additional solvent to maintain the dispersion.

Oily dispersions of the antifungals are preferably prepared by dilution of the antifungal concentrates with an alkanol and/or by adding a surface active agent, followed by dilution with an oily liquid. For example, clear solutions may be produced from an antifungal concentrate containing 100 milligrams of antifungal in one milliliter of isopropanol, by adding 20 milliliters of isopropanol per milliliter of concentrate, and then diluting with 80 milliliters of fuel oil, to produce a solution containing about 1000 p.p.m. of the antifungal. Fuel oil is a preferred oily liquid from the standpoint of low phytotoxicity, low evaporation, cost and availability, but other appropriate organic liquids may be employed, as for example, ethylene glycol monomethyl ether, cyclohexanol, and cyclohexanone. Similarly, a concentrate containing 100 milligrams of antifungal per milliliter of the solvent, the antifungal being provided as technical grade material containing 150–350 milligrams of antifungal per gram of solids, may be diluted with 30 parts by volume of isopropanol, followed by 70 parts by volume of fuel oil, to produce a solution containing about 1000 p.p.m. of the antifungal. As an example of the preparation of a clear, oily solution containing a surface active agent, a concentrate containing 100 milligrams per milliliter of isopropanol is diluted with 20 volumes of isopropanol, then 1 volume of one of the aforementioned surface active agents preferred for oily solutions, and then 80 volumes of fuel oil. The final antifungal concentration is about 1000 p.p.m., and the concentration can be reduced by dilution with fuel oil.

The following examples are furnished to assist in providing a complete understanding of the invention, but it is to be understood that the invention is not limited thereto or to the specific ingredients, proportions and procedures set forth therein, which are only illustrative.

EXAMPLE 1

A concentrate of Phytoactin in isopropanol was employed in a field test for the control of apple powdery mildew. The concentrate, prepared from a technical grade Phytoactin product containing about 200 milligrams of Phytoactin per gram of solid, contained 40 milligrams of Phytoactin and 0.5 milliliter of surface active agent (Triton X–155) per milliliter. The test consisted of five randomized replications with three trees per treatment in each replication. Three replications were of the Jonathan apple variety and two replications were of the Rome apple variety. Three aqueous sprays of Phytoactin at 200 p.p.m. were applied by power sprayer; at the cluster-bud stage, at the calyx stage and at the first cover stage. Five weeks after the third spray application, the trees were examined, and the data indicated that there was a 74.5% reduction in prevalence of mildew-infected shoots on the Phytoactin-treated trees as compared with the non-treated controls.

EXAMPLE 2

The Phytoactin concentrate described in Example 1 and diluted in the same manner was employed in a field test for the control of apple powdery mildew, apple scab (*Venturia inaequalis*), apple cedar rust (*Gymnosporangium juniperi virginianae*), apple sooty blotch (*Gloedes pomigena*) and fly speck (*Leptothyrium pomi*). The test consisted of six replicate 7-year old Rome apple trees. Ten aqueous sprays of Phytoactin at 200 p.p.m. were applied by high pressure sprayer; at the pink stage, at the late bloom stage, at petal fall and seven cover sprays at approximately 10–14 day intervals. Antifungal treatment was stopped two months before harvest. Early foliage readings were made during the test period and foliage and fruit readings made at harvest. As indicated by the data in Table I the early foliage readings (50 leaf stations scored at each of 6 points about the periphery of each tree) showed excellent disease control.

Table I

| Treatment | Total infected leaves | | |
|---|---|---|---|
| | Apple powdery mildew | Apple scab | Apple cedar rust |
| Check—no treatment | 15 | 1,057 | 1,252 |
| 200 p.p.m. Phytoactin | 1 | 50 | 250 |

The data obtained at harvest is shown in Table II.

Table II

| Treatment | Percent disease | | | | |
|---|---|---|---|---|---|
| | Foliage | | Fruit | | |
| | Apple scab | Apple cedar rust | Apple scab | Apple cedar rust | Apple sooty blotch [1] |
| Check—no treatment | 58.7 | 69.6 | 41.9 | 8.6 | 94.5 |
| 200 p.p.m. Phytoactin | 2.8 | 13.9 | 0.9 | 7.3 | 34.2 |

[1] Includes fly speck.

EXAMPLE 3

The Phytoactin concentrate described in Example 1 and diluted in the same manner was employed in a field test for the control of apple scab. The test consisted of three Red Rome variety trees replicated four times. The aqueous spray solution contained 200 p.p.m. Phytoactin and was applied by power sprayer late in the scab infection season and on trees on which infection had already occurred; at very late petal fall, and five cover sprays approximately two weeks apart. Antifungal treatment was stopped approximately 2½ months before harvest. As indicated by the data in Table III, excellent eradication and control of scab was obtained.

Table III

| Treatment | Percent Commercial fruit scab [1] | Percent Total fruit scab |
|---|---|---|
| Check—no treatment | 94.6 | 98.3 |
| 200 p.p.m. Phytoactin | 12.2 | 19.7 |

[1] Scab lesions of sufficient size or number to eliminate fruit from U.S. No. 1 grade.

EXAMPLE 4

The Phytoactin concentrate described in Example 1 and diluted in the same manner was employed in a field test for the control of apple scab. The test consisted of single Richard Delicious tree treatments replicated six times. The aqueous spray solution contained 200 p.p.m. Phytoactin and 2 ounces of an additional surface active agent (Triton B–1956) per 100 gallons, and was applied by means of a power sprayer at the pre-pink stage, pink stage, calyx stage and four cover sprays at approximately 2–3 week intervals. Antifungal treatment was stopped approximately 2½ months before harvest. Early foliage infection readings, made after the first cover spray, indicated excellent control of apple scab as shown by the data in Table IV.

Table IV

| Treatment: | Average percent apple scab leaf infections |
|---|---|
| Check—no treatment | 51.7 |
| 200 p.p.m. Phytoactin | 3.4 |

The readings made on the harvested fruit indicated that the antifungal gave very good control of the disease, as shown by the data in Table V.

Table V

| Treatment: | Average percent scab infected apples |
|---|---|
| Check—no treatment | 84.3 |
| 200 p.p.m. Phytoactin | 28.5 |

EXAMPLE 5

Purified Phytoactin and Phytostreptin were used in a greenhouse test for the control of pear powdery mildew. Replicated heavily mildewed small potted pear seedlings were sprayed with aqueous solutions containing 100 p.p.m. Phytoactin or Phytostreptin and a trace of wetting agent (Triton B–1956). The antifungals were dissolved in methanol prior to dilution with water. Two sprays were applied, 10 days apart, and readings made one week after the second spray application. As indicated by the data in Table VI, excellent control and eradication of mildew was obtained with these antifungals.

Table VI

| Treatment | No. of plants treated | Average number of leaves per plant | | | |
|---|---|---|---|---|---|
| | | Before treatment | | After treatment | |
| | | Diseased | Healthy | Diseased | Healthy |
| Check | 5 | 55 | 14 | 53 | 17 |
| 100 p.p.m. Phytoactin | 4 | 44 | 9 | 0 | 48 |
| 100 p.p.m. Phytostreptin | 5 | 76 | 0 | 3 | 85 |

EXAMPLE 6

The Phytoactin concentrate described in Example 1 and diluted in the same manner was employed in a commercial greenhouse test for the control of rose powdery mildew. Sixty-five randomized heavily mildewed potted Orleans variety rose plants were sprayed with an aqueous solution containing 100 p.p.m Phytoactin. Approximately 150 untreated plants served as checks. One spray was applied using a hand sprayer. When the plants were examined one week later, the powdery mildew had been almost completely eradicated from the treated plants while the untreated plants were still heavily infected.

EXAMPLE 7

The Phytoactin concentrate described in Example 1 and diluted in the same manner was employed in a commercial greenhouse test for the control of rose powdery mildew. Twenty-six randomized heavily mildewed potted Garnet variety rose plants were sprayed with an aqueous solution containing 100 p.p.m. Phytoactin. An equal number of untreated plants served as checks. Two sprays were applied, 9 days apart, using a hand sprayer. When the plants were examined one week after the last spray application, the powdery mildew had been completely eradicated from the treatment plants.

EXAMPLE 8

The Phytoactin concentrate described in Example 1 and diluted in the same manner was employed in a practical garden trial for the control of zinnia powdery mildew. A number of heavily mildewed Burpee Hybrid zinnia plants were sprayed with an aqueous solution containing 200 p.p.m. Phytoactin. An approximate equal number of infected plants were not sprayed and served as checks. Two sprays were applied, 6 days apart, using a hand sprayer. When the plants were examined two weeks after the last spray application, the powdery mildew had been completely eradicated from the treated plants while the untreated plants were still heavily infected.

EXAMPLE 9

Purified Phytoactin and Phytostreptin were employed in a greenhouse test for the control of bean powdery mildew. Replicate potted bean plants were sprayed with aqueous solutions containing 100 p.p.m. Phytoactin or Phytostreptin and the plants allowed to become naturally infected by placing them in close proximity to heavily infected bean plants. Replicate untreated plants infected in a similar manner served as checks. When heavy powdery mildew infection occurred on the check plants, all plants were examined and scored. The Phytoactin-treated plants showed an 83% reduction of infection, and the Phytostreptin-treated plants showed a 57% reduction of infection, compared to the untreated infected check plants.

EXAMPLE 10

Purified phytoactin and Phytostreptin were employed in a greehouse test for the control of cucumber powdery mildew. Replicate potted cucumber plants were sprayed with an aqueous solution containing Phytoactin or Phytostreptin and the plants allowed to become naturally infected by placing them in close proximity to heavily infected cucumber plants. Replicate untreated plants infected in a similar manner served as checks. When heavy powdery mildew infection occurred on the check plants, all plants were examined and scored. The Phytoactin-treated plants showed a 52% reduction of infection, and the Phytostreptin-treated plants showed a 68% reduction of infection, compared to the untreated infected check plants.

EXAMPLE 11

The Phytoactin concentrate described in Example 1 and diluted in a similar manner was employed in a field test for the control of cucumber powdery mildew. A 50 foot row of cucumber plants (variety SMR-12) was sprayed with an aqueous solution containing 100 p.p.m. Phytoactin. A total of seven spray applications were made during the growing season. An untreated 50 foot row of cucumber plants served as checks. The plots were scored at harvest, and as indicated by the data in Table VII, excellent disease control and fruit yield were obtained in the Phytoactin-treated plot.

Table VII

| Treatment | Yields | | |
|---|---|---|---|
| | Disease Rating [1] | No. fruits per plot | Lbs. fruit per plot |
| Check—no treatment | 3.08 | 699.7 | 60.2 |
| 100 p.p.m. Phytoactin | 1.50 | 789.0 | 72.2 |

[1] Disease rating from 0 to 4 (maximum).

EXAMPLE 12

The Phytoactin concentrate described in Example 1 and diluted in a similar manner was employed in a field test for the control of squash powdery mildew. Replicate mildewed squash plants were sprayed with an aqueous solution containing 100 p.p.m. Phytoactin and replicate untreated mildewed plants served as checks. One spray application was made and random plants examined and scored one week later. As indicated by the data in Table VIII, considerable control and eradication of powdery mildew was obtained using Phytoactin.

Table VIII

| Treatment | Number of leaves in each infection category [1] | | | | |
|---|---|---|---|---|---|
| | 1 | 2 | 3 | 4 | 5 |
| Checks—no treatment | 61 | 37 | 39 | 34 | 29 |
| 100 p.p.m. Phytoactin | 92 | 62 | 39 | 6 | 1 |

[1] Infection category:
1 = No mildew.
2 = mild infection.
3 = medium infection.
4 = severe infection.
5 = very severe infection.

EXAMPLE 13

Purified Phytoactin and Phytostreptin were employed in a greenhouse test for the control of wheat powdery mildew. Replicate potted mildewed plants were sprayed with aqueous solutions containing varying concentrations of Phytoactin or Phytostreptin. When used at 10–40 p.p.m. both antibiotics effectively eradicated the powdery mildew infection.

The characteristics of the antifungals Phytoactin and Phytostreptin which are employed in the invention, and their production by fermentation are described in my copending applications with Bennett, Cairney and Chow, Phytoactin and Production Thereof, Serial No. 7,064, filed February 5, 1960, now U.S. Patent 3,032,471, and Phytostreptin and Production Thereof, Serial No. 6,979, filed February 5, 1960, now U.S. Patent 3,032,470, respectively, the disclosures of which are incorporated herein by reference to avoid excessive repetition. These applications are continuations-in-part of, respectively, the patent applications Serial No. 628,769, filed December 17, 1956, and Serial No. 659,818, filed May 17, 1957. The antifungals and their productions are also characterized in the following description.

PHYTOACTIN

Phytoactin is a polypeptide having no terminal free amino group as indicated below by its chemical and physical properties. It is a very light tan solid and is soluble in methanol, ethanol, isopropanol, n-butanol, chloroform, acetone, methylisobutyl ketone, dioxane, tetrahydrofuran, formamide, ethylene chloride and 1 N NaOH. It is insoluble in petroleum ether (30–60° C.), benzene, and ethyl acetate, and slightly soluble in diethyl ether, 1 N HCl, and water.

Phytoactin gives a positive permanganate test, and negative anthrone, ferric chloride, Molisch and ninhydrin tests. It gives no color with cold concentrated sulfuric acid. It is precipitated from aqueous methanol solutions by ammonium sulfate, calcium chloride, cupric chloride, lead acetate, mercuric chloride, sodium chloride, zinc chloride, picric acid, salicylic acid, phosphotungstic acid, trichloroacetic acid, methyl orange and Reinecke salt.

Phytoactin also gives a positive biuret test, and negative Millon, Liebermann Buchard, Maltol, Pauly, Ehrlich (dimethylaminobenzaldehyde), and Sakaguchi tests.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycerine and serine were identified.

Phytoactin (methanol solution) is heat stable, unchanged after heating for 7 days at 40° C. or for 3 hours at 65° C. It is dialyzable through a cellophane membrane (30% aqueous methanol). It is not digested by pepsin, trypsin, Pabst purified *Bacillus subtilis* bacterial protease or Pabst purified *Aspergillus oryzae* fungal protease.

Phytoactin exhibits strong end absorption in the lower regions of the ultra-violet with no significant maxima in the region 230–410 m$\mu$. Determinations were made in methanol (100 $\mu$g./ml.) with a Beckman DU spectrophotometer.

Phytoactin shows a number of characteristic absorption bands in the infrared region when dissolved in chloroform, the more significant of which are at the following frequencies (expressed in microns): 2.92, 3.04, 3.38, 3.43, 3.48, 5.72, 6.03, 6.54, 6.87, 7.06, 7.23, 7.56, 7.72, 7.80, 8.05, 8.24, 8.68, 9.39, 9.43, 10.07, 10.30, 10.72, 10.80 and 11.00. The spectrum was obtained on a Perkin-Elmer Model 21, doublebeam infrared spectrophotometer, Serial No. 760 (gain 5.0, response 1.0 speed 5.0, suppression 3.0).

In order to eliminate the absorption of the chloroform solvent, the infrared absorption spectrum of Phytoactin was also obtained in a potassium bromide pellet, on a Baird Model 455 I.R. spectrophotometer. There is relatively litle change from the determination in chloroform solution. Phytoactin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at 6.0–6.07 (1670–1640), 6.83–6.90 (1470–1450), 7.20–7.35 (1390–1360), 7.57–7.93 (1320–1260), and 9.25–9.43 (1080–1060) (very weak):

Phytoactin is optically active; laevo rotatory, $$(\alpha)_D^{25} -86°$$

(c.=1, methanol). The following electrometric titration data were obtained (titration started from acid range):

| Solvent | pK | Equivalent weight, grams/mole | Remarks |
|---|---|---|---|
| Water | 2.4 | 400 to 500 | No free amino group. |
| 70% methanol | 3.4 | 3,000 | Do. |

Phytoactin exhibits an indefinite melting point, commencing at about 150° C. and melting with apparent decomposition. Melting ranges were determined in a sealed capillary in an oil bath, as follows: 154–162° C., 148–168° C., and 148–171° C.

Elemental analysis of Phytoactin gave the following values:

| C | H | N |
|---|---|---|
| 56.48 | 8.28 | 12.46 |
| 56.71 | 8.28 | 12.24 |
| 57.12 | 8.11 | 12.57 |
| 57.14 | 8.34 | 12.57 |
| [1] 56.86 | [1] 8.25 | [1] 12.46 |

[1] Average.

Amide nitrogen was found to be 0.9%. Sulfur and halogen are absent.

The molecular weight of Phytoactin has been determined to be 46,000 (plus or minus 10%) by the Ehrenberg modification of the Archibald method for the approach to sedimentation equilibrium. Two ultracentrifuge determinations were made, in pH 7.2, 0.01 molar "tris" buffer with 0.05 molar NaCl added as a supporting electrolyte. Phytoactin obtained as described herein satisfied the first criterion for ultracentrifugal homogeneity in "velocity ultracentrifuge" experiments. The material gave only one sedimenting boundary, which remained symmetrical throughout the experiments.

Phytoactin was examined by one-dimensional paper chromatography using Whatman No. 1 paper and the solvent systems indicated in Table I. The developed chromatograms were air dried at room temperature and bioautographed on agar plates seeded with *Glomerella cingulata*.

Table I.—Chromatographic Data for Phytoactin

| System | $R_f$ | Remarks | Running Time, hrs. |
|---|---|---|---|
| Water saturated n-butanol | 0.96 | Well defined spot | 16 |
| n-butanol-acetic acid-water (2-1-1) | 0.94 | do | 16 |
| n-Butanol- pyridine- water (1-0.6-1) | 0.97 | do | 16 |
| 3% aqueous ammonium chloride | 0.02 | do | 4 |
| 50% aqueous acetone | 0.52 / 0.94 | Tailing / Well defined spot | 6 |
| Benzene-acetic acid-water (2-2-1, organic phase) | 0.18 | Tailing | 16 |
| Tert. butanol-acetic acid-water (74-3-25) | 0.89 | Well defined spot | 28 |

The chromatographic data for Phytoactin is consistent with the unusual solubility of this polypeptide compound in such fat-solvents as acetone, methylisobutylketone, and chloroform.

Phytoactin is particularly effective against fungi. It also has antibacterial properties. Its in vitro spectrum against a number of fungi and bacteria is shown in Table II. These tests were run in slant tubes using agar media containing various concentrations of the antibiotic in the range of 0.01 to 197 micrograms per ml. Potato dextrose agar was used for all of the fungal cultures. Penassay seed agar was used for *Candida albicans* and the bacterial cultures. Sabouraud maltose agar was used for the dermatophytes *Epidermophyton floccosum*, *Microsporum gypseum*, and *Trichophyton mentagrophytes*. The agar media were inoculated with the respective test organism and incubated at 28° C., until the control tube, containing no antibiotic, showed good growth (approximately 2–4 days for the fungal cultures and 1 day for *C. albicans* and the bacterial cultures). The inhibiting concentration of Phytoactin for each of these organisms was then noted. The incubation period was then continued for four days and two additional inhibition readings made; at two days and four days respectively (after the initial reading). One culture, *Endoconidiophora fagacearum* (*Ceratocystis fagacearum*), the causative agent of oak wilt, was incubated for an additional four week period with no change in the inhibitory level of Phytoactin (0.3 μg. per ml.). Attempts to isolate *E. fagacearum* (*C. fagacearum*) from the inhibited levels were unsuccessful. Another culture, *Ceratostomella ulmi* (*Ceratocystis ulmi*), the causative agent of Dutch elm disease, was also incubated for an additional four week period with no change in the inhibiting level of Phytoactin (0.8 μg. per ml.). Attempts to isolate *C. ulmi* from the inhibited levels were unsuccessful.

*Table II.—In Vitro Antimicrobial Spectrum of Phytoactin*

| Culture | Culture inhibited at indicated concentration (μg./ml.) | | |
|---|---|---|---|
| | After initial growth [1] | 2 days later | 4 days later |
| Alternaria dianthi | 0.8 | 2.4 | 7.3 |
| Alternaria solani | 0.8 | 0.8 | 0.8 |
| Botrytis gladiolorum | 2.4 | 2.4 | 2.4 |
| Botrytis cinerea | 0.8 | 2.4 | 2.4 |
| Ceratostomella ulmi (Ceratocystis ulmi) | 0.8 | 0.8 | 0.8 |
| Colletotrichum circinans | 0.8 | 0.8 | 0.8 |
| Diplodia zeae | 0.8 | 2.4 | 7.3 |
| Endoconidiophora fagacearum (Ceratocytis fagacearum) | 0.3 | 0.3 | 0.3 |
| Endoconidiophora fimbriata (Ceratocystis fimbriata) | 0.8 | 0.8 | 0.8 |
| Endothia parasitica | 0.8 | 0.8 | 2.4 |
| Fusarium oxy. f. dianthi 5A | 2.4 | [2] 2.4-197 | [2] 2.4-197 |
| Fusarium oxy. f. gladioli | 0.8 | 7.3 | [2] 2.4-197 |
| Fusarium roseum | 2.4 | 7.3 | 7.3 |
| Gibberella zeae | 7.3 | [2] 22-197 | [3] >197 |
| Glomerella cingulata | 0.3 | 0.8 | 0.8 |
| Helminthosporium sativum | 0.8 | 0.8 | 0.8 |
| Helminthosporium victoriae | 0.8 | 0.8 | 0.8 |
| Macrophominia phaseoli | 2.4 | 2.4 | 2.4 |
| Phytophthora cinnamomi | 7.3 | [2] 22-197 | [2] 22-197 |
| Pythium sp. No. 389 | 2.4 | 22 | 22 |
| Rhizoctonia solani | 2.4 | 2.4 | 2.4 |
| Sclerotina fructicola | 0.8 | 0.8 | 0.8 |
| Ustilago sphaerogena | 2.4 | 2.4 | 2.4 |
| Verticillium albo-atrum | 0.8 | 2.4 | 2.4 |
| Candida albicans | 2.4 | 2.4 | 2.4 |
| Epidermophyton floccosum | 0.8 | 0.8 | 2.4 |
| Microsporum gypseum | 2.4 | 2.4 | 2.4 |
| Trichophyton mentagrophytes | 0.8 | 0.8 | 0.8 |
| Bacillus cereus | 7.3 | 22 | 22 |
| Bacillus cereus var. mycoides | 7.3 | 22 | 22 |
| Bacillus megatherium | 7.3 | 7.3 | 7.3 |
| Bacillus subtilis | 22 | 22 | 22 |
| Escherichia coli | [3] >197 | >197 | >197 |
| Micrococcus flavus | 2.4 | 2.4 | 2.4 |
| Micrococcus pyogenes var. aureus | 7.3 | 22 | 22 |
| Mycobacterium tuberculosis No. 607 | [3] >197 | >197 | >197 |
| Sarcina lutea | 7.3 | 22 | 22 |

[1] Inhibition reading made when control tube shows good growth—usually 2-4 days.
[2] Partial inhibition of culture.
[3] No inhibition at this level.

Phytoactin has been shown in greenhouse studies to be an effective fungicide for the control of plant diseases such as tomato early blight, tomato late blight, bean rust and wheat leaf rust. These diseases are caused respectively by *Alternaria solani* (Ell. and Mort.) Jones and Grout, *Phytophthora infestans* (Mont.) de Bary, *Uromyces phaseoli* (Pers.) Wint. and *Puccinia rubigo-vera* (DC) Wint.

Phytoactin is formed during cultivation of a microorganism of the family Streptomycetaceae, specifically, a strain of the species *Streptomyces hygroscopicus*. A culture of a microorganism strain which was isolated from domestic United States soil and produces Phytoactin has been deposited in the culture collection of the United States Department of Agriculture, Agricultural Research, Northern Utilization Research and Development Division, Peoria, Illinois, and the culture has been assigned the number NRRL 2752 in the culture collection. The strain is referred to herein as *Streptomyces hygroscopicus* NRRL 2752, or for brevity, NRRL 2752. The characteristics of this organism are as set forth in the following description.

*Stropetomyces hygroscopicus* NRRL 2752.—The organism NRRL 2752 produces spiral sporophores and the slightly oval to spherical spores measure 1-1.5 microns in diameter. The growth characteristics of the organism were observed following incubation on the diagnostic media indicated below for 23 days at 28° C., and any modifications in growth characteristics which occurred after 23 days and up to 44 days at 28° C. were noted. The following growth characteristics were observed, the aerial mycelium colors being described according to Ridgeway, Color Standards and Color Nomenclature (Washington, D.C., 1912):

Asparagine-glucose-meat extract agar: Excellent growth with pallid neutral to pale neutral grey aerial mycelium. Black areas forming after 14 days, becoming moist after 30 days. Light yellow-brown reverse and light brown soluble pigment.

Bennett's agar: Excellent growth with colorless moist vegetative mycelium. Light yellow-brown reverse and light brown soluble pigment.

Corn steep liquor agar (Waksman): Moderate growth with colorless moist vegetative mycelium. Light yellow-brown reverse with fairly strong brown soluble pigment.

Czapek agar (Difco): Excellent growth with pallid to neutral grey aerial mycelium. Black areas forming after 23 days, not becoming moist after 44 days. Light yellow reverse and light brown soluble pigment.

Gelatin (Waksman): Not liquefied after 9 days; liquefied after 16 days.

Litmus milk: White ring of growth with slight coagulation. 25% peptonization after 7 days, 60% after 14 days, 70% after 23 days, 90% after 30 days and 100% after 44 days. Milk pH 6.55 after 23 days.

Nitrate broth (Difco): Reduced.

Oatmeal-yeast extract agar: Moderate growth with pallid mouse to light mouse grey aerial mycelium. Black areas forming after 23 days becoming moist after 30 days.

Potato dextrose agar: Excellent growth with pallid neutral to light neutral grey aerial mycelium. Black areas forming after 30 days, not becoming moist after 44 days. Yellow reverse and light brown soluble pigment.

Potato plug: Poor growth with brownish vegetative mycelium. White to light grey on drying tip.

Starch agar (Difco): Moderate growth with pallid mouse grey aerial mycelium. Black areas forming after 14 days, becoming moist after 23 days. Light yellow-brown reverse and light brown soluble pigment.

Yeast extract agar (Waksman): Excellent growth with colorless vegetative mycelium and few white areas. Light yellow-brown reverse and light brown soluble pigment.

The above results included the dark areas characteristic of *S. hygroscopicus*, which were exhibited on asparagine-glucose-meat extract agar, Czapek agar, oatmeal-yeast extract agar, potato dextrose agar, and starch agar. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

PHYTOSTREPTIN

Phytostreptin is a polypeptide having an apparent free amino group as indicated below by its chemical and physical properties. It is a very light tan solid and is soluble in water, 1 N sodium hydroxide (forms gel on standing), methanol, ethanol, isopropanol, n-butanol, chloroform, acetone, methylisobutyl ketone, dioxane, tetrahydrofuran, formamide, and ethylene chloride. It is slightly soluble in diethyl ether and 1 N HCl, and insoluble in petroleum ether (30°–60° C.), benzene, and ethyl acetate.

Phytostreptin gives positive permanganate and biuret tests and negative anthrone, ferric chloride, Molisch, ninhydrin, Millon, Liebermann Buchard, Maltol, Pauly, Ehrlich (dimethylaminobenzaldehyde), Sakaguchi and Fehling tests. It gives no color with cold concentrated sulfuric acid. It is precipitated from aqueous solution by ammonium sulfate, calcium chloride, barium chloride, cupric chloride, sodium chloride, zinc chloride, picric acid, phosphotungstic acid, trichloroacetic acid, methyl orange and reinecke salt.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine and serine were identified.

Phytostreptin is heat stable; no loss of activity occurred when a methanol solution was refluxed (65° C.) for 6 hours or when 30% aqueous methanol solutions, adjusted to pH 3, 7 and 10, were heated at 85° C. for 30 minutes. It is dialyzable through a cellophane membrane (aqueous solution). It is not digested by pepsin, trypsin, Pabst purified Bacillus substilis bacterial protease or Pabst purified Aspergillus oryzae fungal protease.

Phytostreptin exhibits strong end absorption in the lower regions of the ultraviolet with no significant maxima in the region 230–410 m$\mu$. Determinations were made in methanol (100 $\mu$g./ml.) with a Beckman DU spectrophotometer.

Phytostreptin shows a number of characteristic absorption bands in the infrared region when dissolved in chloroform, the more significant of which are at the following frequencies (expressed in microns): 2.93, 3.08, 3.20, 3.33, 3.45, 3.52, 4.12, 5.71, 5.74, 6.05, 6.15, 6.56, 6.70, 6.95, 7.12, 7.60, 7.76, 7.86, 8.12, 8.86, 9.05, 9.42, 10.06, 10.34, 10.80, 11.00, 11.46, 11.70 and 13.30. The spectrum was obtained on a Perkin-Elmer Model 21, double-beam infrared spectrophotometer, Serial No. 760 (gain 5.0, response 1.0, speed 6.0 and suppression 3.0).

In order to eliminate the absorption of the chloroform solvent, the infrared absorption spectrum of Phytostreptin was also obtained in a potassium bromide pellet, on a Baird Model 455 I.R. spectrophotometer. There is relatively little change from the determination in chloroform solution. Phytostreptin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at: 6.0–6.07 (1670–1640), 6.83–6.90 (1470–1450), 7.20–7.35 (1390–1360) (shoulder), 7.57–7.93 (1320–1260), and 8.77–9.43 (1140–1060).

Phytostreptin is optically active; laevo rotary $(\alpha)_D^{26}$ —81° (c.=1, methanol). The following electrometric titration data were obtained (titration started from acid range):

| Solvent | pK | Equivalent weight, grams/mole | Remarks |
| --- | --- | --- | --- |
| Water | 2.4 | 1,000 | Apparent free carboxyl group. |
|  | 9.6 | 3,500 | Apparent free amino group. |
| 70% Methanol | 3.4 | 3,300 | Apparent free carboxyl group. |
|  | 9.4 | 3,300 | Apparent free amino group. |

Phytostreptin exhibits an indefinite melting point, commencing at about 165° C. and melting with apparent decomposition. Melting ranges were determined in a sealed capillary in an oil bath, as follows: 168–178° C., 166–172° C., and 166–173° C.

Elemental analysis of Phytostreptin gave the following values:

| C | H | N |
| --- | --- | --- |
| 52.56 | 7.93 | 13.53 |
| 52.44 | 7.66 | 13.26 |
| 53.70 | 8.44 | 13.38 |
| 53.45 | 8.29 | 13.48 |
| [1] 53.04 | [1] 8.08 | [1] 13.41 |

[1] Average.

Amide nitrogen was found to be 1.5%. Sulfur and halogen are absent.

The molecular weight of Phytostreptin has been determined to be 28,600 (plus or minus 10%) by the Ehrenberg modification of the Archibald method for the approach to sedimentation equilibrium. Two ultracentrifuge determinations were made in pH 7.2, 0.01 molar "tris" buffer with 0.05 molar NaCl added as a supporting electrolyte. Phytostreptin obtained as described herein satisfied the first criterion for ultracentrifugal homogeneity in "Velocity ultracentrifuge" experiments. The material gave only one sedimenting boundary, which remained symmetrical throughout the experiments.

Phytostreptin was examined by ascending one-dimensional paper chromatography using Whatman No. 1 paper and the solvent systems indicated in Table III. The developed chromatograms were air dried at room temperature and bioautographed on agar plates seeded with Glomerella cingulata.

Table III.—Chromatographic Data for Phytostreptin

| System | $R_f$ | Remarks | Running time, hours |
| --- | --- | --- | --- |
| Water saturated with n-butanol. | 0.00 | well defined spot | 7 |
| n-Butanol saturated with water. | 0.91 | do | 16 |
| n-Butanol-acetic acid-water (2-1-1). | 0.93 | do | 16 |
| n-Butanol-pyridine-water (1-0.7-1). | 0.92 | do | 16 |
| 3% aqueous ammonium chloride. | 0.00 | do | 4 |
| 50% aqueous acetone | 0.53 / 0.93 | Tailing / Well defined spot | 6 |
| Tert. butanol-acetic acid-water (74-3-25). | 0.91 | Well defined spot | 28 |
| n-Butanol-methanol-water (4-1-2). | 0.98 | do | 8 |
| Benzene-methanol (4-1) | 0.98 | do | 5 |

The chromatographic data for Phytostreptin is consistent with the unusual solubility of this polypeptide compound in such fat solvents as acetone, methylisobutylketone, and chloroform.

Phytostreptin forms alkali metal salts such as the sodium salt with alkali metal bases, and other simple and complex salts of Phytostreptin can readily be prepared. Phytostreptin salts include the copper, zinc and manganese salts, and the molybdate, picrate, helianthate and reineckate complex salts. These salts are slightly soluble or soluble in water, 1 N sodium hydroxide, and chloroform. They are slightly soluble in 1 N HCl, and soluble in methanol and acetone. The salts are active against the test organism Glomerella cingulata.

Phytostreptin is particularly effective against fungi. It also has antibacterial properties. Its in vitro spectrum against a number of fungi and bacteria is shown in Table IV. In addition, in a paper disc-agar plate assay test using potato dextrose agar, Phytostreptin developed zones of inhibition against Ceratostomella ulmi (Ceratocystis ulmi), the causative agent of Dutch elm disease, at about 40 micrograms per milliliter.

The tests reported in Table IV were made in agar slant tubes using agar media containing various concentrations of Phytostreptin in the range of 0.01 to 197 micrograms per ml. The same procedures were used as previously described for Phytoactin in connection with Table II. One culture, *Endoconidiophora fagacearum* (*Ceratocystis fagacearum*), the causative agent of oak wilt, was incubated for an additional four week period with no change in the inhibitory level of Phytostreptin (0.3 microgram (μg.) per milliliter). Attempts to isolate *E. fagacearum* (*C. fagacearum*) from the inhibited levels were unsuccessful.

*Table IV.—In Vitro Antimicrobial Spectrum of Phytostreptin*

| Culture | Culture inhibited at indicated concentration (μg./ml.) | | |
|---|---|---|---|
| | After initial growth [1] | 2 days later | 4 days later |
| *Alternaria dianthi* | 2.4 | 2.4 | 2.4 |
| *Alternaria solani* | 0.8 | 0.8 | 0.8 |
| *Botrytis gladiolorum* | 0.8 | 0.8 | 2.4 |
| *Botrytis cinerea* | 2.4 | 2.4 | 2.4 |
| *Colletotrichum circinans* | 0.8 | 2.4 | 2.4 |
| *Diplodia zeae* | 2.4 | 2.4 | 2.4 |
| *Endoconidiophora fagacearum* (*Ceratocystis fagacearum*) | 0.3 | 0.3 | 0.3 |
| *Endoconidiophora fimbriata* (*Ceratocystis fimbriata*) | 0.8 | 0.8 | 0.8 |
| *Endothia parasitica* | 0.8 | 2.4 | 2.4 |
| *Fusarium oxy. f. dianthi* 5A | 7.3 | [2] 7.3–197 | [2] 7.3–197 |
| *Fusarium oxy. f. gladioli* | 2.4 | [2] 2.4–197 | [2] 2.4–197 |
| *Fusarium roseum* | 2.4 | 7.3 | 22 |
| *Gibberella zeae* | 7.3 | [2] 7.3–197 | [2] 22–197 |
| *Glomerella cingulata* | 0.3 | 0.8 | 2.4 |
| *Helminthosporium sativum* | 0.8 | 2.4 | 2.4 |
| *Helminthosporium victoria* | 0.8 | 0.8 | 0.8 |
| *Macrophominia phaseoli* | 2.4 | 2.4 | 2.4 |
| *Phytophthora cinnamomi* | 7.3 | [2] 7.3–197 | [2] 7.3–197 |
| *Pythium* sp. No. 389 | 7.3 | 22 | 22 |
| *Sclerotina fructicola* | 0.8 | 0.8 | 2.4 |
| *Rhizoctonia solani* | 2.4 | 2.4 | [2] 2.4–197 |
| *Verticillium albo-atrum* | 0.8 | 2.4 | 2.4 |
| *Candida albicans* | 2.4 | 2.4 | 2.4 |
| *Epidermophyton floccosum* | 0.8 | 0.8 | 2.4 |
| *Microsporum gypseum* | 2.4 | 2.4 | 2.4 |
| *Trichophyton mentagrophytes* | 0.8 | 2.4 | 2.4 |
| *Bacillus cereus* | 7.3 | 22 | 22 |
| *Bacillus cereus* var. *mycoides* | 7.3 | 22 | 22 |
| *Bacillus megatherium* | 7.3 | 7.3 | 7.3 |
| *Bacillus subtilis* | 7.3 | 22 | 22 |
| *Escherichia coli* | [3] >197 | >197 | >197 |
| *Micrococcus flavus* | 0.3 | 2.4 | 2.4 |
| *Micrococcus pyogenes* var. *aureus* | 2.4 | 7.3 | 7.3 |
| *Mycobacterium tuberculosis* No. 607 | [3] >197 | >197 | >197 |
| *Sarcina lutea* | 2.4 | 2.4 | 2.4 |

[1] Inhibition readings made when control tube showed good growth—usually 1–4 days.
[2] Partial inhibition of culture.
[3] No inhibition at this level.

Phytostreptin and the above simple and complex salts have been shown in greenhouse studies to be an effective fungicide for the control of plant diseases such as tomato early blight, tomato late blight, and bean rust. These diseases are caused respectively by *Alternaria solani* (Ell. and Mort.) Jones and Grout, *Phytophthora infestans* (Mont.) de Bary, and *Uromyces phaseoli* (Pers.) Wint.

Phytoactin and Phytostreptin closely resemble each other in their characteristics and properties, yet they are readily distinguished by their properties of water solubility, elemental analysis, molecular weight, percent of amide nitrogen, infrared spectrum, and electrometric titration. Both of the antifungals are clearly distinct from the other antifungal antibacterial antibiotics previously reported.

Phytostreptin is likewise produced by cultivation of a member of the family Streptomycetaceae, specifically, a strain of the species *Streptomyces hygroscopicus*. A culture of a strain of a microorganism which was isolated from domestic United States soil and which produces Phytostreptin has been deposited in the above culture collection and assigned the number NRRL 2751. The characteristics of the strain NRRL 2751 closely resemble those of the strain NRRL 2752. There are, however, morphological and biochemical characteristics that distinguish the two microorganisms, notably, a marked difference in the rate of peptonization of milk. Darker aerial mycelium are also formed by NRRL 2752 on a number of media. A description of the organism NRRL 2751 follows:

*Streptomyces hygroscopicus* NRRL 2751.—The organism NRRL 2751 produces spiral sporophores and the slightly oval to spherical spores measure 1–1.3 microns in diameter. The growth characteristics of the organism were observed following incubation on the media indicated for 23 days at 28° C., and any modifications in growth characteristics which occurred after 23 days and up to 44 days at 28° C. were noted. The following growth characteristics were observed, the aerial mycelium colors being described according to Ridgeway, supra.

Asparagine-glucose-meat extract agar: Excellent growth with neutral grey aerial mycelium. Light yellow-brown reverse and light brown soluble pigment.

Bennett's agar: Excellent growth with colorless dry vegetative mycelium. Light yellow-brown reverse and light brown soluble pigment.

Corn steep liquor agar (Waksman): Excellent growth with colorless, dry (moist after 7 days), wrinkled vegetative mycelium. Sparse white aerial mycelium forming after 30 days. Light yellow-brown reverse with fairly strong brown soluble pigment.

Czapek agar (Difco): Excellent growth with pallid to pale neutral grey aerial mycelium. Black areas forming after 30 days, not becoming moist after 44 days. Light yellow reverse and light brown soluble pigment.

Gelatin (Waksman): Liquefied after 9 days.

Litmus milk: Colorless to white ring of growth with no coagulation. No peptonization after 7 days, 100% after 14 days. Milk pH 6.6 after 23 days.

Nitrate broth (Difco): Reduced.

Oatmeal-yeast extract agar: Excellent growth with neutral grey aerial mycelium. Black areas forming after 30 days, not becoming moist after 44 days.

Potato dextrose agar: Excellent growth with light neutral to neutral grey aerial mycelium. Yellow-brown reverse and light brown soluble pigment.

Potato plug: Poor growth with colorless vegetative mycelium. White to light grey on drying tip. Black areas forming in butt after 44 days.

Starch agar (Difco): Excellent growth with mouse grey aerial mycelium. Light yellow-brown reverse and faint brown soluble pigment.

Yeast extract agar (Waksman): Excellent growth with pale smoke grey aerial mycelium. Dark grey areas forming after 30 days, not becoming moist after 44 days. Light yellow-brown reverse and light brown soluble pigment.

The above results included the dark areas characteristic of *S. hygroscopicus*, which were exhibited on Czapek agar, oatmeal-yeast extract agar, potato plug, and yeast extract agar. In addition, the organism showed moist black areas on year-old refrigerated starch agar slants. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

PRODUCTION OF ANTIFUNGALS BY FERMENTATION

The antifungals are produced by fermenting a nutrient medium with a Phytoactin or Phytostreptin producing micro-organism such as *Streptomyces hygroscopicus* NRRL 2752 or 2751, respectively. Preferably, an aqueous nutrient medium is fermented under submerged, aerobic and agitated conditions until substantial antifungal activity is produced. The antifungals may be routinely determined by the agar plate assay method, using *Glomerella cingulata* or *Candida albicans* as the test organism.

Nutrient media which are suitable for the production of the antifungal include a suitable source of assimilable carbon, preferably a carbohydrate source such as glucose, a source of assimilable nitrogen such as soya flour, corn steep liquor, yeast and the like, and mineral salts, which may be present with the other ingredients, such as corn steep liquor. Inoculum of the organism is prepared by growing it on agar slant media such as oatmeal or peptone-yeast extract. These agar slant cultures can then be used to prepare larger amounts of inoculum by seeding shake flasks containing such media as soya flour and corn steep liquor. These flasks are shaken under conditions suitable for the growth of the organism. The shake flask cultures can then be used for the preparation of larger amounts of inoculum or, alternatively, they may be used to seed the fermentors directly. Aseptic conditions must be maintained during the preparation of the inoculum and during the subsequent fermentation.

In the fermentation, the desired medium is prepared and the pH of the medium adjusted to about 6.3–7.5, preferably 6.7–7.2. Calcium carbonate is included in the preferred medium. The medium so prepared is sterilized by heating at an elevated temperature under pressure, i.e., at about 120° C. The medium is then cooled to a temperature of approximately 24°–36° C., preferably 27°–34° C. The sterile medium is then inoculated under aseptic conditions with the inoculum prepared as described above.

The fermentation then proceeds at a temperature in the foregoing ranges with agitation and aeration using sterile air. The fermentation period may vary with different media and different operating conditions. Air is ordinarily supplied at the rate of about 0.25–1.5 volumes of free air per volume of medium per minute. The fermentation is continued for a period of time sufficient to achieve optimal and preferably maximal production of Phytostreptin or Phytoactin as the case may be. A fermentation period of 48–96 hours is ordinarily sufficient.

The antifungal may be recovered by a number of methods or, alternatively, the whole culture or whole broth may be used as such or may be concentrated or dried by suitable means. It is ordinarily preferred to recover the antifungal by precipitation or by solvent extraction of the whole culture or whole broth. In the precipitation recovery method, the whole culture is usually filtered or centrifuged at a preferred pH range of 7–8, and the filtrate is acidified to a preferred pH range of 3–5 to precipitate the antifungal. The preferred acid for this precipitation step is hydrochloric acid, although other acids may also be used. Since the culture mycelium contains appreciable quantities of the antifungal, the whole culture (without filtration) may, alternatively, be adjusted to pH 3–5 for the precipitation step.

The activity may be recovered from the precipitate or sediment by extraction with a suitable organic liquid in which it is soluble, such as methanol, ethanol, isopropanol, butanol, acetone or methylisobutyl ketone. The solvent solution may then be evaporated in vacuo, and the resulting residue further extracted with organic solvents. In the preferred method of recovery, the latter residue after evaporation is extracted exhaustively with methylisobutyl ketone, and the solvent solution is concentrated to small volume in vacuo. The antifungal may then be precipitated by the addition of 5 volumes of diethyl ether. The antifungal remaining in the methylisobutyl ketone-ether mother liquor may be recovered by concentrating the mother liquor to small volume in vacuo and adding 5 volumes of petroleum ether (30°–60° C.) to precipitate the activity. Alternatively, a solvent extract of the whole culture, whole broth or active precipitated sediment may be used as such or after concentration in vacuo without further purification.

The invention thus provides a unique solution to the difficult problem of controlling powdery mildew, which has taken a large toll of crops and of ornamental plants. Effective control and frequently eradication are produced with very small quantities of the antifungals.

The invention is hereby claimed as follows:

1. The method of controlling powdery mildew plant disease which comprises contacting the causative fungus in the vicinity of susceptible plants with a fungicidal amount of an antifungal selected from the group consisting of polyamidohygrostreptin and polyaminohygrostreptin.

2. The method of controlling powdery mildew plant disease which comprises contacting susceptible plants with a fungicidal amount of an antifungal selected from the group consisting of polyamidohygrostreptin and polyaminohygrostreptin.

3. The method of controlling apple powdery mildew which comprises contacting the plant with a fungicidal amount of an antifungal selected from the group consisting of polyamidohygrostreptin and polyaminohygrostreptin.

4. The method of controlling pear powdery mildew which comprises contacting the plant with a fungicidal amount of an antifungal selected from the group consisting of polyamidohygrostreptin and polyaminohygrostreptin.

5. The method of controlling rose powdery mildew which comprises contacting the plant with a fungicidal amount of an antifungal selected from the group consisting of polyamidohygrostreptin and polyaminohygrostreptin.

6. The method of controlling wheat powdery mildew which comprises contacting the plant with a fungicidal amount of an antifungal selected from the group consisting of polyamidohygrostreptin and polyaminohygrostreptin.

7. The method of controlling fungus disease caused by Sphaerotheca fungi which comprises contacting said fungi with a fungicidal amount of an antifungal selected from the group consisting of polyamidohygrostreptin and polyaminohygrostreptin.

8. The method of controlling fungus disease caused by Podosphaera fungi which comprises contacting said fungi with a fungicidal amount of an antifungal selected from the group consisting of polyamidohygrostreptin and polyaminohygrostreptin.

9. The method of controlling fungus disease caused by Erysiphe fungi which comprises contacting said fungi with a fungicidal amount of an antifungal selected from the group consisting of polyamidohygrostreptin and polyaminohygrostreptin.

10. The method of controlling powdery mildew plant disease caused by the fungus *Sphaerotheca pannosa* which comprises contacting said fungus in the vicinity of susceptible plants with a fungicidal amount of an antifungal selected from the group consisting of polyamidohygrostreptin and polyaminohygrostreptin.

11. The method of controlling powdery mildew plant disease caused by the fungus *Podosphaera leucotricha* which comprises contacting said fungus in the vicinity of susceptible plants with a fungicidal amount of an antifungal selected from the group consisting of polyamidohygrostreptin and polyaminohygrostreptin.

12. The method of controlling apple powdery mildew which comprises contacting the plant with an aqueous dispersion of about 100 to 300 parts per million of polyamidohygrostreptin.

13. The method of controlling pear powdery mildew which comprises contacting the plant with an aqueous dispersion of about 100 to 300 parts per million of polyamidohygrostreptin.

14. The method of controlling rose powdery mildew which comprises contacting the plant with an aqueous dispersion of about 100 to 300 parts per million of polyamidohygrostreptin.

15. The method of controlling apple powdery mildew which comprises contacting the plant with an aqueous dispersion of about 100 to 300 parts per million of polyaminohygrostreptin.

16. The method of controlling pear powdery mildew which comprises contacting the plant with an aqueous dispersion of about 100 to 300 parts per million of polyaminohygrostreptin.

17. The method of controlling rose powdery mildew which comprises contacting the plant with an aqueous dispersion of about 100 to 300 parts per million of polyaminohygrostreptin.

18. The method of treating fruit trees susceptible to powdery mildew and other fungus diseases which comprises contacting the susceptible parts with a fungicidal amount of an antifungal from the group consisting of polyamidohygrostreptin and polyaminohygrostreptin.

19. The method of treating apple trees which comprises spraying them during the growing season with an antifungal from the group consisting of polyamidohygrostreptin and polyaminohygrostreptin in amounts effective to inhibit powdery mildew and apple scab.

20. The method of treating apple trees which comprises spraying them during the growing season with polyamidohygrostreptin in amounts effective to inhibit powdery mildew and apple scab.

No references cited.